O. A. KRENKE.
ADJUSTABLE SPACING COLLAR.
APPLICATION FILED APR. 6, 1911.
1,012,564.
Patented Dec. 19, 1911.
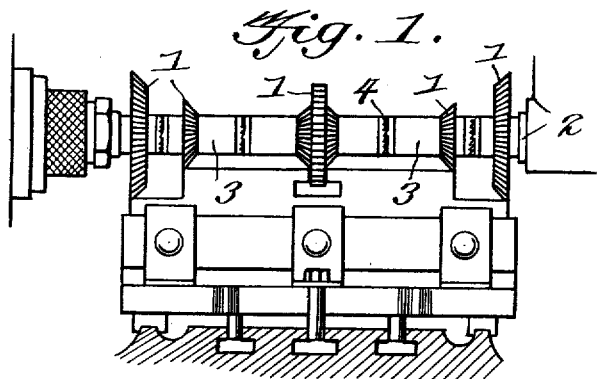
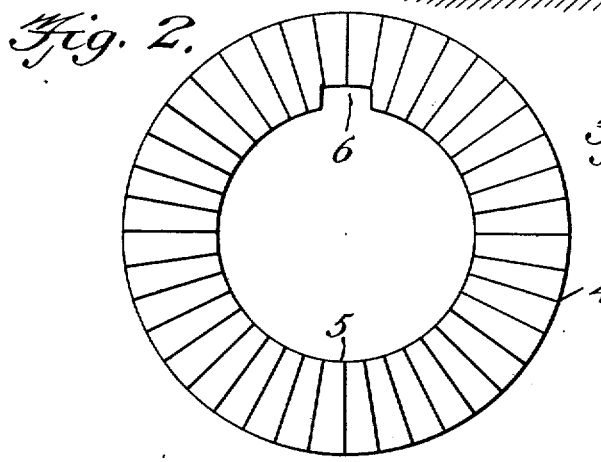
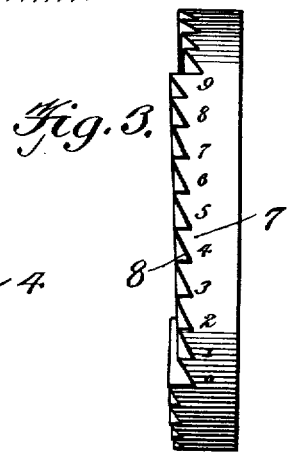
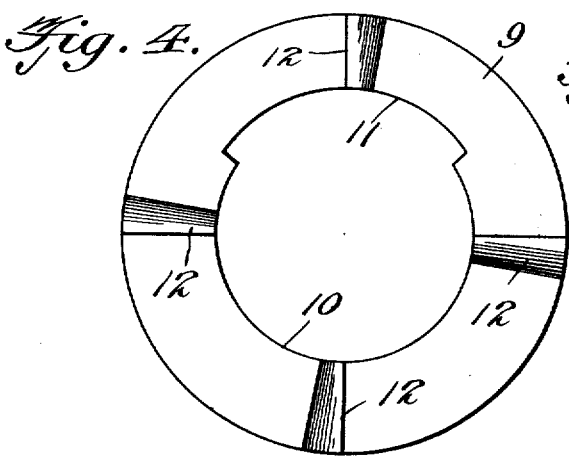
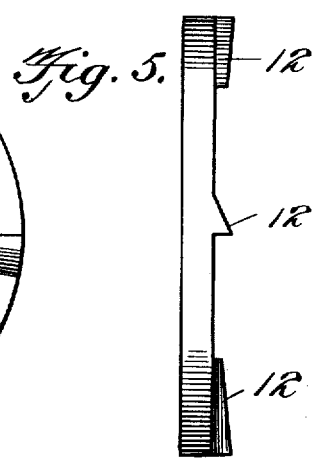
Inventor
Otto A. Krenke
Witnesses
Frank B. Hoffman
Jas. W. Lacey
By
Gould & Gould
Attorneys

UNITED STATES PATENT OFFICE.

OTTO A. KRENKE, OF PORT HURON, MICHIGAN.

ADJUSTABLE SPACING-COLLAR.

1,012,564.  Specification of Letters Patent.  Patented Dec. 19, 1911.

Application filed April 6, 1911. Serial No. 619,260.

*To all whom it may concern:*

Be it known that I, OTTO A. KRENKE, a citizen of the United States, residing at Port Huron, in the county of St. Clair and State of Michigan, have invented certain new and useful Improvements in Adjustable Spacing-Collars, of which the following is a specification.

The invention relates generally to an improvement in milling or planing machines, and more particularly to a means whereby the cutting tools may be accurately and positively adjusted with relation to each other and with regard to the particularities of the work in hand in a simple, convenient and expeditious manner.

The main object of the invention is the provision of spacing collars arranged in coöperating pairs on the cutter arbor or axis, one collar of each pair being arranged for independent rotary adjustment with relation to the other collar, and the proximate surfaces of the respective collars of each pair being formed to insure an adjusted lateral spacing of the collars under such rotary movement, whereby the collars may be adjusted with relation to each other to induce longitudinal movement of the adjacent spacing sleeves and thereby vary the spacing between adjacent cutters as may be necessary.

The invention in the preferred embodiment of details will be described in the following specification, reference being had particularly to the accompanying drawings, in which:—

Figure 1 is an elevation of a portion of a milling machine, illustrating the application of the improvement thereto. Fig. 2 is a side elevation of one of the spacing collars, hereinafter referred to as the fixed collar. Fig. 3 is an edge elevation of the same. Fig. 4 is a side elevation of the coöperating spacing collar hereinafter termed the movable collar. Fig. 5 is an edge elevation of the same.

Referring particularly to the accompanying drawings, it will be noted from Fig. 1 that the improvement is shown as applied to an ordinary type of milling machine, in which the cutters or tools 1 are designed to be keyed upon the usual cutter arbor or axis 2, and held thereon in desired spaced relation and in more or less accurate position by spacing sleeves 3.

As heretofore practiced it has been customary to use spacing collars of different thicknesses and to apply such collars in place on the arbor as may be necessary to adjust the cutters for various work. This necessitates a great variety of spacing collars, and in a majority of instances the making of a new collar of the particular thickness required when needed for the special adjustment. As the use of this means of adjustment requires the separation of the sleeves and cutters from the arbor to apply such collars, it is obvious that a considerable loss of time and a material increase in expense are involved in such operation. The present invention is designed to obviate this by permitting any desired range of adjustment, within the limits of the improved collars by a simple rotary movement of the movable collar to the desired point. By such improved means the loss of time and labor in making new collars and the disconnection and reassembling of the parts is entirely avoided.

The improved adjusting means comprises what may be termed a coöperating pair of spacing collars, one of which will be designated the fixed collar, being designed to be held in fixed relation to the cutter arbor and to the cutters, and the other, the movable collar, being designed for limited movement with relation to the fixed collar to secure the desired adjustment. The fixed collar 4, as will be noted in Fig. 2 comprises an annular metallic section of substantial radial dimension and having a central opening 5 to fit the cutter arbor, being additionally formed with a key-way 6 to coöperate with the cutter key and thereby fix the collar 4 with relation to the arbor and cutters. The operative face of the fixed collar is divided into four equal quadrant sections 7, each of which is formed with an identical series of teeth or indentations 8. These teeth, which in their corresponding relation on each section are identical, vary one from the other in corresponding proportion from one end of the section to the other. Considering the transverse dimension or thickness of the collar as the basis of the teeth arrangement, it will be noted that the first or entrant tooth of each section has its base or bottom wall spaced a definite distance from the opposing surface of the collar, and that each succeeding tooth throughout the section has its bottom wall increased a corresponding distance over the preceding tooth. In other words the series of teeth throughout each section present a gradually increased thickness of collar from the initial to the final tooth. The ratio of increase is the same for each tooth and for convenience such ratio of increase will be in thousandths of an inch. By reference to the scale adjacent each section the particular tooth engaged will indicate by its opposite scale number the spacing increase over the initial or normal position of the spacing collars.

The movable collar 9, illustrated in Fig. 4, is identical in size with the fixed collar, and comprises an annular section having a central opening 10 to fit over the cutter arbor and a key way 11 to coöperate with the cutter key. In this instance however, the key way is of a length to permit a quarter turn of the movable collar. The operative face of the movable collar, or that surface in contact with the toothed surface of the fixed collar is formed at equally spaced points with four radially arranged projections 12 designed to coöperate with the teeth or indentations 8 of the stationary collar. The indentations or teeth 8 and projections 12 are regularly and mechanically formed for efficient coöperation, whereby to obviate lost motion and secure an operative and solid contact between the projection 12 and any one of the indentations when the movable collar is adjusted.

In use, it being understood that a pair of spacing collars is arranged between each two adjacent cutters, bearing between the spacing sleeves, as indicated in Fig. 1, it will be obvious that any desired adjustment of one cutter with relation to either adjacent cutter can be readily and accurately secured by turning the movable collar until each and all of the projections 12, which of course coöperate with a similar tooth of each section of the fixed collar, engage that tooth of the fixed collar which indicates the desired adjustment. This operation, requires simply the movement of the collar 9, eliminates the necessity for making new collars for the particular work, and dispenses with the loss of time and labor in the making of such collars and in the dismantling and reassembling of the machine.

It is of course understood that the degree of adjustment indicated by the above scale is merely illustrative and that I contemplate the use of any proportional variation between the teeth. Furthermore, I contemplate the use of movable collars having different sized projections 12 so that a particular movable collar can be used with any particular fixed collar to permit a range of adjustment suitable to the particular work in hand.

The relative sizes and material of the spacing collars are not important as I contemplate constructing the same in any size and of any material permitting the accomplishment of the result desired.

Having thus described my invention, what I claim is—

1. A spacing means for rotary cutters including coöperating spacing collars arranged to permit the rotary movement of one with relation to the other, the adjacent faces of the respective collars being formed with coöperating means adapted in said rotary movement to induce an axial movement of one collar with relation to the other, whereby to vary at will the distance between the outer or remote faces of the collars.

2. A spacing device for rotary cutters including coöperating spacing collars, means for fixing one of said collars with relation to the cutters, said other collar being arranged to permit a limited rotary movement, means formed on the contacting faces of the collars and adapted in the rotary operation of the movable collar to axially move said respective collars to vary the distance between their outer or bearing faces.

3. A spacing device for rotary cutters, including coöperating spacing collars, means for fixing one of said collars with relation to the cutters, means for permitting a limited rotary movement of the other of said collars, one of said collars being formed of a series of equally spaced projections, the other of said collars being formed with a corresponding number of toothed sections, each of said projections coöperating with one of the sections during said limited rotary movement.

4. A spacing device for rotary cutters, including coöperating spacing collars, means for fixing one of said collars with relation to the cutters, means for permitting a limited rotary movement of the other of said collars, one of said collars being formed of a series of equally spaced projections, the other of said collars being formed with a corresponding number of toothed sections, each of said projections coöperating with one of the sections during said limited rotary movement, each succeeding tooth of each section varying the transverse dimension of the collar as compared with the adjacent tooth.

5. A spacing means including spacing collars arranged for relatively independent movement, the operative face of one collar being divided into quadrant sections formed throughout with teeth gradually increased in height from the initial to the final tooth, the operative face of the opposing collar being formed with a series of projections to coöperate respectively with the teeth of the sections.

6. A spacing device for rotary cutters including annular spacing collars, one of said collars being formed with an internal key way to fix said collar with relation to the cutters, the other of said collars being formed with a key way to permit a limited rotary movement of said collar with relation to the cutters, the coöperating faces of the respective collars being formed for interbearing at four distinct equally spaced points, the bearing surface of one collar being fixed and of the other collar varying throughout, whereby in the movement of one collar the transverse dimensions of the collars may be varied.

7. The combination with an arbor and rotary cutters keyed thereon, of cutter spacing means including coöperating spacing collars, means for fixing one of said collars with relation to the arbor, and means for permitting a limited rotary movement of the other collar with relation to the arbor, the coöperating faces of the respective collars being formed with interfitting teeth arranged to vary the aggregate transverse dimension of the collars during such rotary movement.

In testimony whereof, I affix my signature in presence of two witnesses.

OTTO A. KRENKE.

Witnesses:
LAWRENCE E. IRWIN,
WILLIAM J. VOGEL.

Copies of this patent may be obtained for five cents each, by addressing the "Commissioner of Patents, Washington, D. C."